INVENTOR
GUSTAV H. SUDMEIER

BY Nilsson, Robbins & Anderson
ATTORNEYS

INVENTOR
GUSTAV H. SUDMEIER

BY Nilsson, Robbins & Anderson
ATTORNEYS

INVENTOR
GUSTAV H. SUDMEIER

BY Wilson, Robbins & Anderson
ATTORNEYS

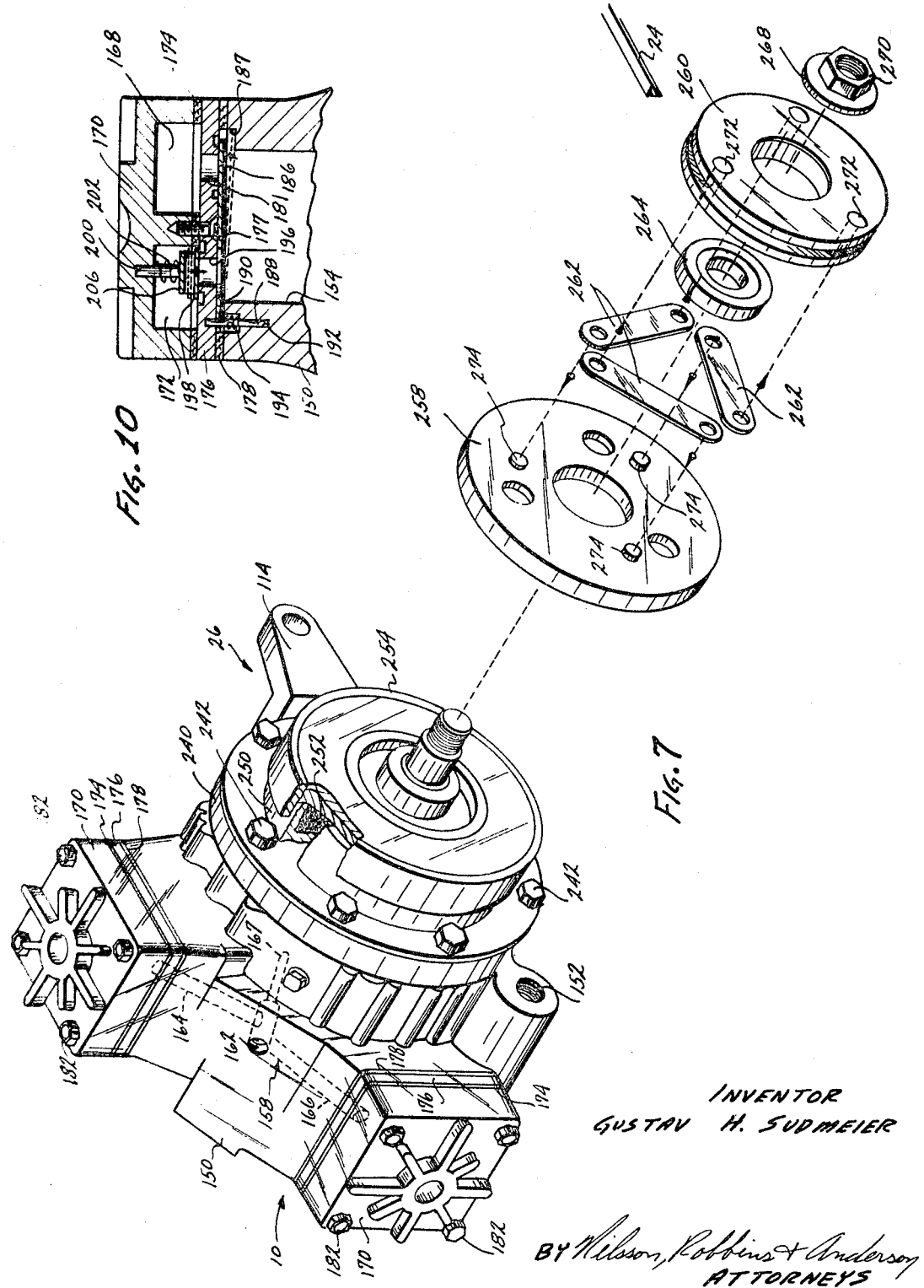

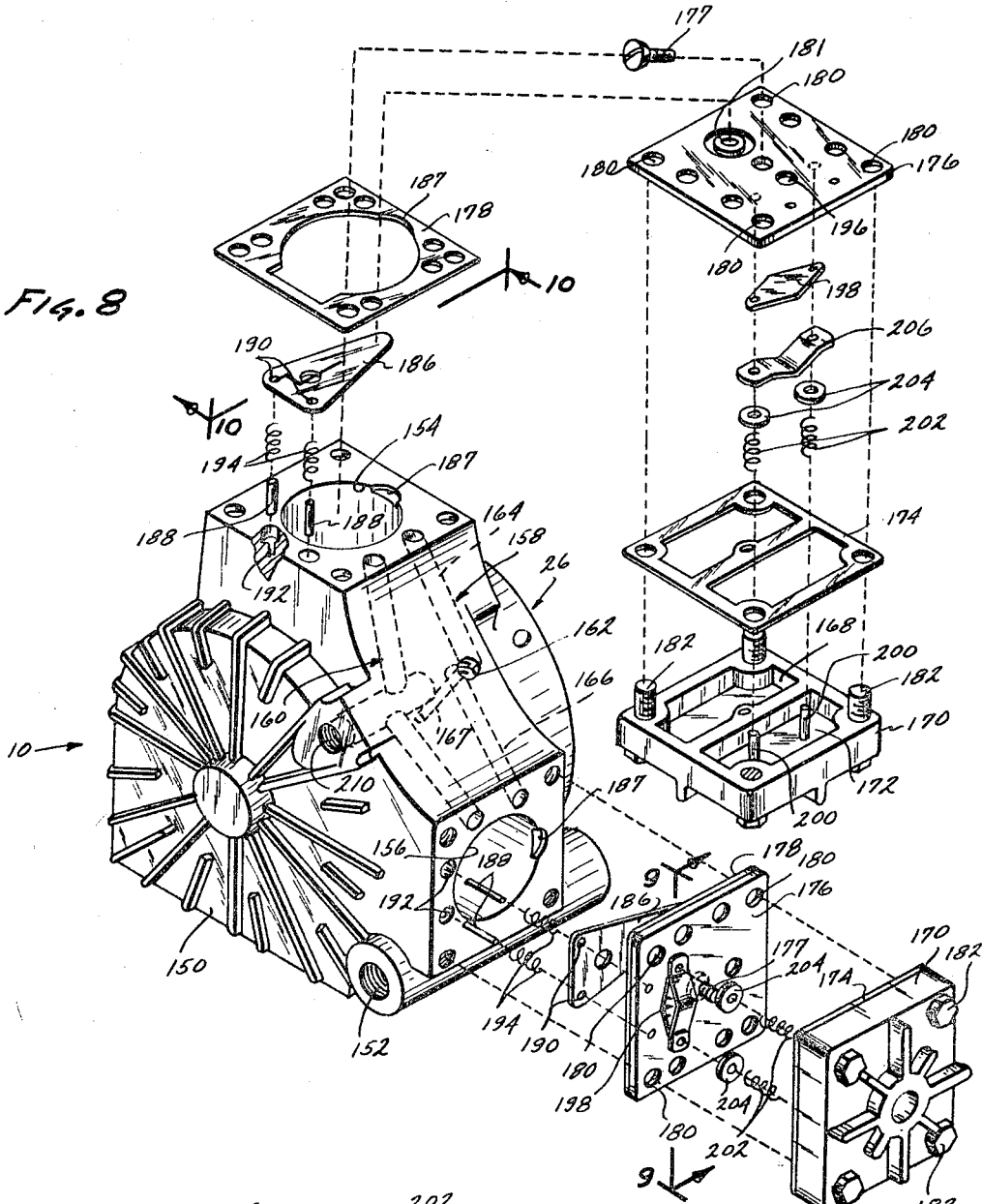

United States Patent Office 3,449,924
Patented June 17, 1969

3,449,924
AUTOMOTIVE AIR-CONDITIONING SYSTEM
Gustav H. Sudmeier, 2708 Torrance Blvd.,
Torrance, Calif. 90502
Filed Apr. 21, 1967, Ser. No. 632,800
Int. Cl. B60h 3/04
U.S. Cl. 62—227      10 Claims

ABSTRACT OF THE DISCLOSURE

An air conditioning system for small automobiles of the type that may incorporate an air-cooled engine. A compression system incorporates a condenser structure horizontally mounted under the automobile and including one portion through which gaseous refrigerant moves forward in relation to the automobile, and another section in which liquid refrigerant moves rearward relative to the automobile. An evaporator is affixed in the automobile passenger space and is operated at or near the limit of its capability by utilizing thermostatic control of the refrigerant. The compressor in the system is operated intermittently through a magnetic clutch and incorporates a double-spring valve structure for improved efficiency and increased capability. The compressor is of compact configuration and is mountable to occupy a very small space.

Background of the invention

In recent years, air-conditioned automobiles have become increasingly popular and practical. Of course, a number of significant developments have been accomplished in the course of attaining the present state of the automotive air conditioning art. However, in general, small compact automobiles (particularly automobiles with an air-cooled engine) commonly have not been air-conditioned. The lack of acceptance of air-conditioning in such automobiles has not been entirely a matter of economics although a number of special considerations have presented sizable problems to any person contemplating an appropriate air-conditioning system. Specifically, small automobiles are typically compact with the result that very little available space exists in which to install the components of an air-conditioning system. This consideration is particularly true with respect to the engine compartment. That is, in general, prior art compressor configurations were not readily usable within the engine compartment of most compact automobiles.

As a related aspect of this situation, in considering prior compressors, units having sufficient capability to accomplish effective air-conditioning far exceeded the size limitations of the engine compartment. Therefore, a need existed for a peculiar compressor configuration, capable of highly efficient operation so as not to draw excessive power from the relatively small engine.

Another problem encountered in air-conditioning a compact automobile is the lack of suitable space for a condenser. That is, many forms of compact automobiles (particularly those with air-cooled engines) do not have any satisfactory air-flow channels for containing a condenser. Therefore, a need has existed for a condense structure which could be suitably incorporated in an auto motive air-conditioning system, and which would func tion in cooperation with such a system installed upon a small or compact automobile.

Another problem encountered in air-conditioning the small automobile was the rather limited availability o power that could be drawn from the engine without un satisfactory results. This limitation has necessitated a highly-efficient system which could be of limited size Although the size limitations are present throughout the automobile, and are particularly critical in the engine compartment, it is also particularly desirable to avoid any further crowding within the passenger compartment In general, the evaporator of an air-conditioning system must be provided either in, or immediately adjacen to the passenger compartment. Therefore, a need ha: existed for a system which could employ a relatively small evaporator to effectively cool the interior passen ger space of a small automobile.

Summary of the invention

An air-conditioning system, utilizing refrigerant to coo a compact automobile of the type having an engine of limited power, and providing limited space for system components. The compressor of the system is of V configuration, incorporates block valve passages defined within the compressor head and furthermore incorporates flap valves that are particularly effective by reason of a spring drive structure. The compressor is driven through a magnetic clutch which is controlled in accordance with the temperature of the evaporator. Specifically the evaporator is operated on the threshold of frosting for effective utilization, by controlling the operation of the compressor through the magnetic clutch. Additionally the system includes a somewhat flat condenser structure adapted for horizontal operation, as under the automobile.

Brief description of the drawing

FIGURE 7 is an exploded perspective view of the clutch portion of the compressor shown in FIGURE 6;

FIGURE 8 is an exploded view of the compressor of FIGURE 6;

FIGURE 9 is a sectional view along line 9—9 of FIGURE 8; and

FIGURE 10 is a sectional view taken along line 10—10 of FIGURE 8.

Detailed description of the illustrative embodiment

Figure 1:
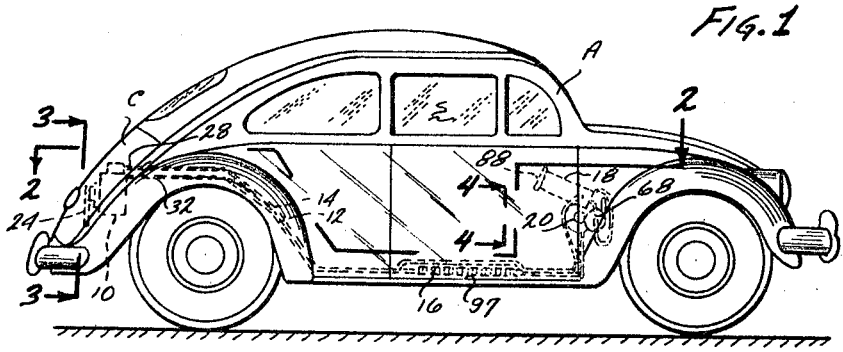
FIGURE 1 is a side elevation of an automobile incorporating a system constructed in accordance with the present invention.

Referring preliminarily to FIGURE 1, there is shown an automobile A having an engine in a rear compartment C and providing a substantial passenger space S. The automobile A represents a class of vehicles which have in the past been particularly difficult to equip with satisfactory systems to air condition the space S. As indicated above, power and space in such vehicles are not readily available, economy is of principal concern, and as in the illustrative embodiment, the automobile lacks established air channels in which a condenser can be positioned for satisfactory operation.

Considering the structure of FIGURE 1 in greater detail, a compressor 10 is fixed in the rear-engine compartment C to be driven by the engine therein. The compressor 10 force circulates refrigerant through fluid ducts generally indicated as lines 12 and 14. The line 12 carries the high-side output from the compressor 10 to a condenser structure 16 in which the pressurized refrigerant is cooled to a liquid state for release in an evaporator 18. Of course, the fluid is released into the evaporator through a discharge orifice (expansion valve) in a cooling reaction. The depressurized refrigerant is then drawn from the evaporator to be returned to the compressor 10 through the line 14, completing the cycle.

The evaporator 18 effectively cools the interior space S of the automobile as a result of the action of a blower 20 mounted to circulate air over the evaporator 18.

In general, the evaporator 18 is operated at peak cooling capacity to minimize the space requirements for that component in the passenger space S. Also noteworthy at this stage of the description, is the position of the condenser structure 16 which is mounted in a horizontal configuration. The precise manner in which the condenser structure 16 is mounted and the nature of its structure enables this unit to operate satisfactorily in spite of acceleration forces on the refrigerant and the horizontal mounting. Additionally, the compressor 10 of the system is an efficient and compact unit of a particular configuration enabling satisfactory use in the system hereof.

Figure 2:
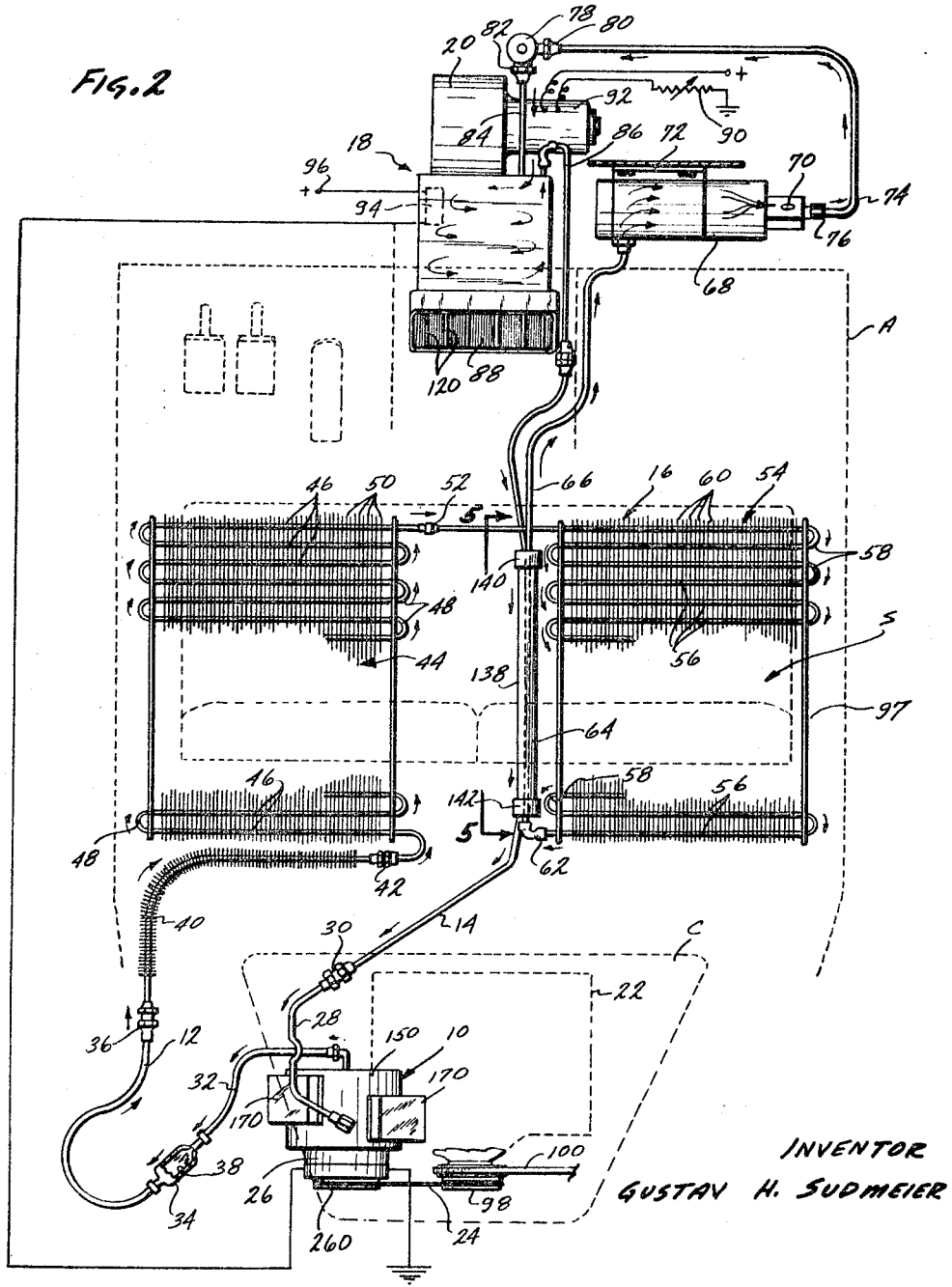
FIGURE 2 is a plan view, somewhat diagrammatic taken along line 2—2 of FIGURE 1.

Considering the system in somewhat greater detail, reference will now be made to FIGURE 2 in which the operating units of the system, as well as the interconnections therebetween, are shown in greater detail. It is to be noted that the automobile A is indicated somewhat in phantom in FIGURE 2, whereby to orient and position the various components of this system in relation to each other and in relation to the automobile A. In view of the above preliminary description of this system, a complete understanding thereof may now be effectively presented by explaining the motion of refrigerant through the system and concurrently introducing and considering in detail the additional components. Specifically, the compressor 10 (more particularly shown in FIGURES 6 through 10) is indicated to be contained in the engine compartment C and is driven by the engine 22 through a belt drive 24 and a magnetic clutch 26. The detailed structure of the magnetic clutch 26 is considered below; however, at this point it is important to appreciate that when the engine 22 is running the compressor 10 operates intermittently under an automatic system including a thermostat that senses the temperature of the evaporator 18.

The compressor 10 receives low-pressure refrigerant through a hose 28 which is connected to rigid line 14 by a coupling 30. At this location the low-pressure refrigerant is in a gaseous form and is drawn into the compressor 10 to be pressurized and forced out through a hose 32 which contains a muffler 34. It is to be understood that the hose 32 (either side of the muffler 34) is of rubber or other resiliently-deformable material and is connected to the duct or line 12 by a coupling 36.

The resiliently-deformable hose 32 functions effectively in cooperation with the muffler 34 to reduce the pulsating vibrations of the compressor 10 that would otherwise be felt by the occupants of the automobile A. The muffler 34 comprises a rigid shell of metal or similar material defining an internal cylindrical cavity 38. It has been discovered that the co-action of the cylindrical cavity with the sections of hose 32 tend to eliminate the propagation of annoying pulsations from the compressor 10 which would otherwise be annoying to the occupants of the automobile A.

After passing through the hose 32, the gaseous refrigerant enters a pre-cooling heat exchanger 40 in the form of a fin-bearing tube. The pre-cooler 40, as shown, is an elongate elbow, which may be formed of copper to include a duct with a radiating structure, that may comprise a continuous spiral fin as shown.

The pre-cooler 40 terminates at a coupling 42 through which the gaseous refrigerant enters the condenser structure 16. Specifically, the coupling 42 introduces the gaseous pressurized refrigerant into a first condenser 44 in which the refrigerant moves through a number of lateral lengths 46 interconnected by short forward-passing turns 48. The lengths 46 carry radiating fins 50 in an integrated structure so that the condenser 44 functions effectively as a heat exchanger to ambient air. It is important to note that the refrigerant, in moving through the condenser 44, normally remains in a gaseous form with the result that acceleration forces imparted to the refrigerant as a result of variations in speed by the automobile A, are of little effect on the refrigerant.

The forward end of the condenser 44 is connected by a coupling 52 to another condenser 54 which is generally similar to the condenser 44, including lateral lengths 56 interconnected by short turns 58 and carrying common fins 60. It is within the condenser 54 that the refrigerant is normally cooled sufficiently to liquify. In this regard, as a pattern, the greatest demand for air-conditioning usually occurs as an automobile is accelerating. The flow within the condenser 54 is rearward with respect to the automobile. Therefore, forward acceleration forces do not retard the flow of the refrigerant to the evaporator. Specifically, the laterally-mounted lengths 56 are relatively unaffected by acceleration forces and the plurality of turns 58 in the condenser 54 collectively tend to somewhat-balance other acceleration forces on the liquified refrigerant.

The output of the condenser 54 (liquid refrigerant) passes through an elbow 62 into a tubular heat exchanger 64 which will be considered in greater detail below. However, at this stage of explanation it is important to appreciate that the heat exchanger 64 functions to further cool the liquid refrigerant from the condenser 54 by transferring heat therefrom to the gaseous spent refrigerant passing to the compressor 10 through the line 14. The heat exchanger 64 also provides an important oil-accumulating function considered below to lubricate the compressor on starting.

From the heat exchanger 64, liquid refrigerant moves forward through a line 66 to a filter 68 incorporating a transparent window 70 through which the refrigerant may be viewed for the presence of air bubbles indicating the need for additional refrigerant. The filter 68, as well-known in the prior art also incorporates a desiccant for capturing water from the refrigerant. Structurally, the filter 68 is affixed to the automobile by a bracket 72 and to an output line 74 by a coupling 76.

The line 74 extends to an expansion valve 78 as well known in the prior art, through which refrigerant is released to gasify in the evaporator 18. Specifically, the expansion valve 78 is connected to the line 74 by a coupling 80 and connected through a coupling 82 and a short line 84 to the coil or evaporator 18. The evaporator may comprise a rather conventional specific structure; however, its operation is maintained at a peak capacity as will be described below.

Fluid expanding into the evaporator 18 cools that unit in the manner very well known in the refrigeration art, eventually exhausting as a low-temperature gas through an output line 86. The air within the passenger compartment or space S is cooled as a result of a blower 20 (FIGURE 2) circulating air through and over the open passages of the evaporator 18. In this regard, a grille 88 is affixed to the upper end of the evaporator 18 as will be described in greater detail below, through which the cool air is vented.

The spent gaseous fluid refrigerant from the evaporator 18 (after passing through the line 86) enters the heat exchanger 64 to impart some further cooling to the liquid refrigerant moving through the heat exchanger 64 in the reverse direction. After passing through the heat exchanger 64 the spent gaseous refrigerant moves through the line 14 to be drawn into the compressor 10 to repeat the cycle for maintaining the evaporator 18 cold.

In the operation of this system the evaporator 18 is continually operated just above the frosting level. In this regard, the operating speed of the blower 20 is controlled by a variable resistor or rheostat 90 (FIGURE 2) which is serially connected across a source of electrical energy along with the blower motor 92. If considerable cooling is desired, the rheostat 90 is set to present very little resistance in series with the motor 92 so that the motor operates at full speed moving considerable air over the evaporator 18. Conversely if relatively little cooling is desired the rheostat 90 is adjusted so that the motor 92 is driven at a slow speed, moving little air through the evaporator 18 for cooling.

The temperature of the evaporator 18 is sensed by a thermostat 94 as very well known in the prior art, which unit is connected between a source of positive potential (applied to the terminal 96) and the coil of a magnetic clutch 26, which is in turn connected to ground potential. Functionally, the thermostat 94 is a two-state switching device being either open or closed. At a time when the thermostat 94 senses the evaporator 18 to be above its minimum operating temperature, the thermostat closes supplying current to the clutch 26 which then couples the belt drive 24 to the compressor 10. Alternatively, if the thermostat 94 senses the evaporator 18 has reached its minimum operating temperature (just above freezing) an open circuit occurs in the thermostat 94 thereby disengaging the clutch 26 with the result that the compressor 10 is rendered temporarily inoperative. This operating arrangement enables the evaporator 18 to be of relatively small size as well as affording simple control and efficient, effective operation.

Considering the physical form of the components of this system in detailed relationship to the automobile A, it is to be noted that the condensers 44 and 54 (FIGURE 2), are positioned under the front seats of the vehicle in a space 97 (FIGURE 1) defining an air flow cavity.

Figure 3:
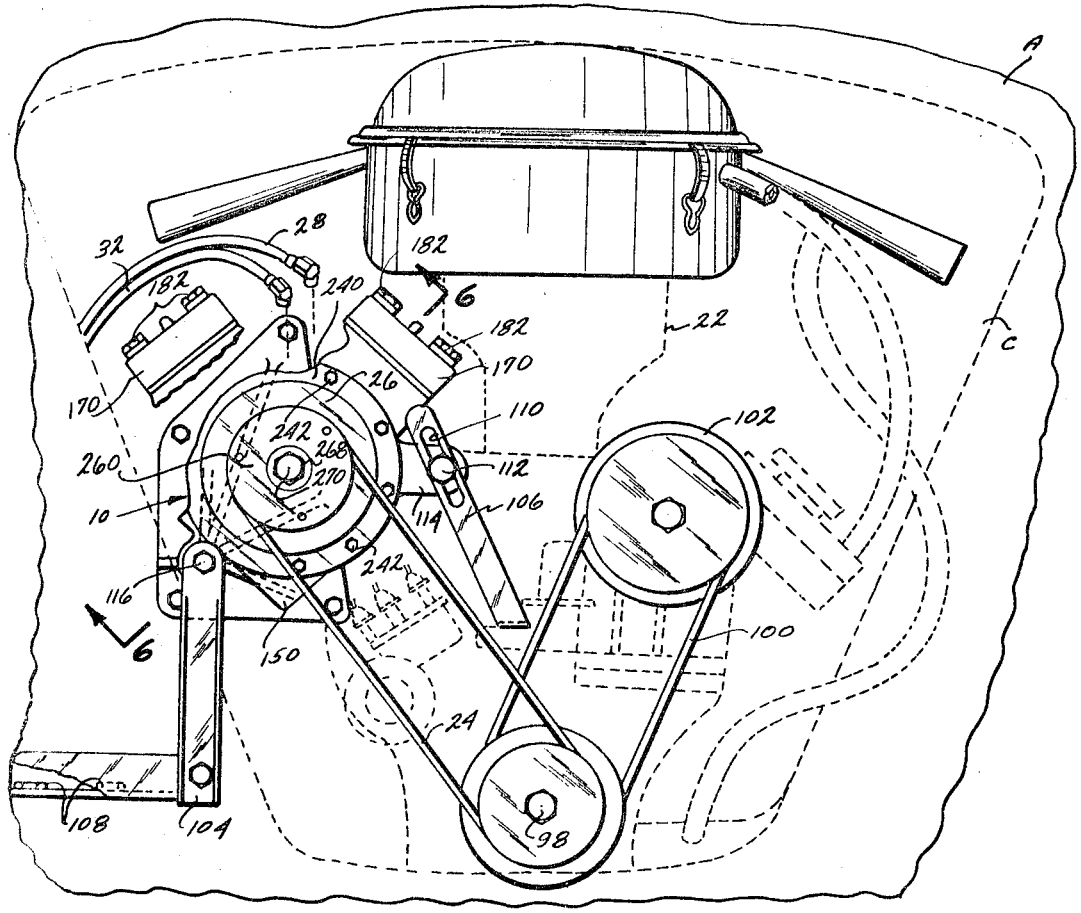
FIGURE 3 is a sectional view taken along line 3—3 of FIGURE 1.

Further considering the individual components in their relationship to the automobile, reference will now be had to FIGURE 3, showing the mounting arrangement of the compressor 10 in the engine compartment C. The belt drive 24 couples the compressor 10 to the drive shaft 98 of the engine 22 (indicated in phantom). It is to be noted, that another belt drive 100 couples the drive shaft 98 to an electrical generator 102 incorporated in the electrical system of the automobile.

The compressor 10 is mounted generally above and to the left of the engine 22 as viewed from the rear, and is supported on a fixed bracket 104 and an adjustable bracket 106. The fixed bracket 104 is anchored to the automobile frame by bolts 108 and the adjustable bracket 106 is affixed to the engine 22. A slot 110 is provided in the adjustable bracket 106, which receives a stud 112 that is threadably engaged with an extension tab 114 which is integral with the compressor. Thus, by releasing the stud 112 and a stud 116 (extending through the fixed bracket 104) the compressor 10 may be pivotally adjusted about the stud 116 to accomplish the desired tension in the belt drive 24. In this regard, it is to be noted that the intake and outlet hoses 32 and 28 are flexible being formed of resiliently-deformable material, e.g. rubber, and may therefore accommodate the desired adjustment. It is to be noted, that as a result of the V-configuration of the compressor 10, the small efficient and compact unit may be accommodated in an exceedingly small space. In this regard, the particular configuration described has been discovered to be well suited to the objectives of the system hereof.

Figure 4:
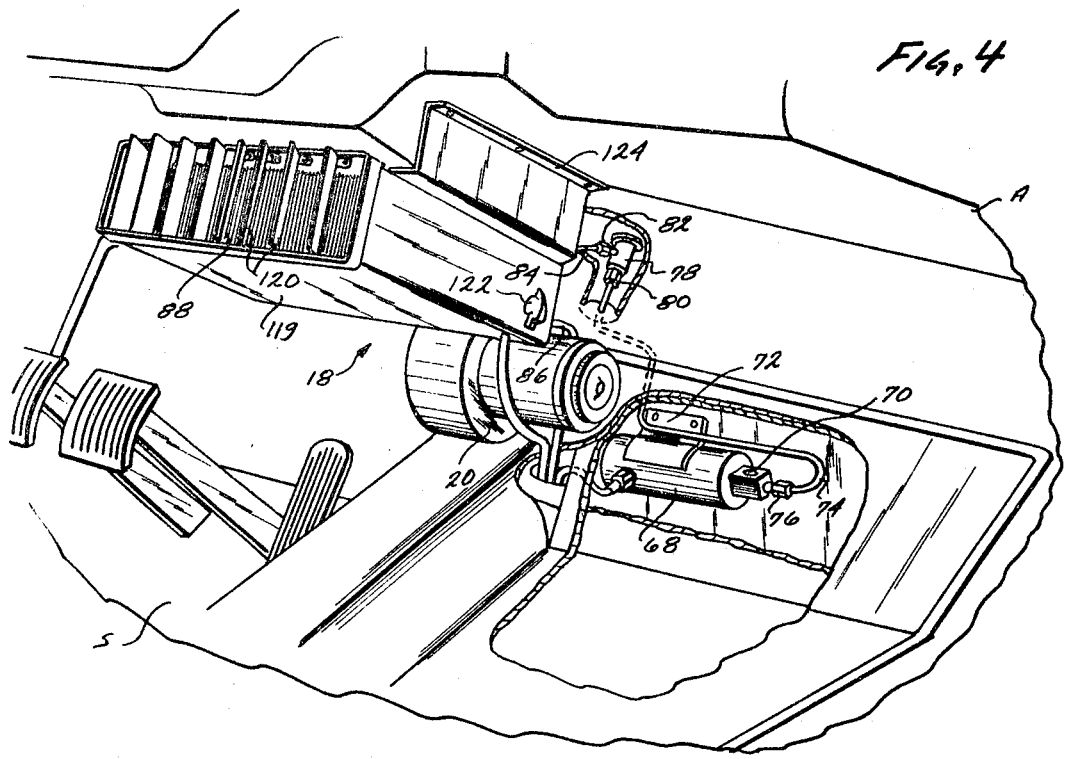
FIGURE 4 is a perspective view of the interior of the automobile taken along line 4—4 of FIGURE 1.

Referring now to FIGURE 4, the forward interior of the automobile is shown to reveal the body of the evaporator 18, as housed and partially closed behind the grill 88. It is to be noted that the grill 88 is affixed to housing 119 and includes a plurality of flexible vanes 120 for variously deflecting the air passing through the evaporator and emerging to cool the interior of the automobile. The blower 20, forcing the air through the evaporator 18 is also shown, along with an adjustment knob 122 serving to set the rheostat 90 as previously described. In this regard, the knob 122 may alternatively be mounted on the dashboard of the automobile or in other convenient locations. The evaporator 18 along with the blower 20 is affixed to the automobile by a bracket structure structure 124, which holds these units in a substantially unobstructing position. Forward of the evaporator 18, the expansion valve 78 is also shown, connected to receive liquid refrigerant from the filter 68.

Figure 5:
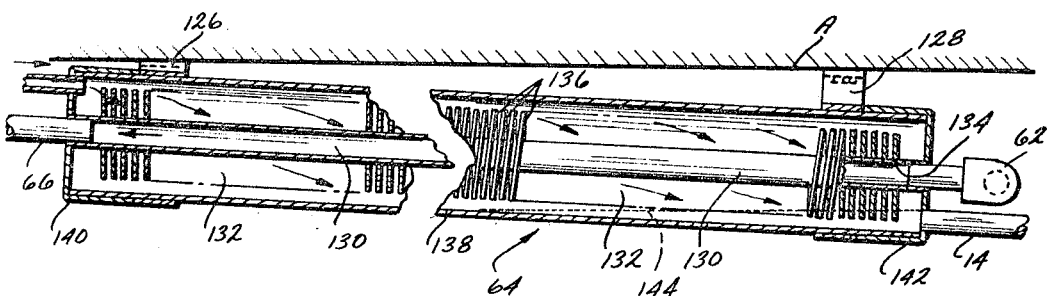
FIGURE 5 is a sectional view taken along line 5—5 of FIGURE 2.

In further considering the position and detailed structure of various components of this system reference will now be made to FIGURE 5, which is a sectional view of the heat exchanger 64 in its mounted relationship to the automobile A. The heat exchanger 64 is of elongated cylindrical configuration and is affixed to the automobile A so that the rear end of the heat exchanger drops below the forward end (relative the car). Specifically, a short bracket 126 affixes the forward end of the heat exchanger 64 to the automobile A while a longer bracket 128 serves at the rear of the heat exchanger 64. The functional importance of this position to provide a reservoir for lubricating oil will be considered below.

A previously described, high-pressure liquid refrigerant passes through the heat exchanger 64 (FIGURE 5) in one direction while low-pressure gaseous refrigerant moves in the opposite direction. Specifically, the high-pressure passage 130 is substantially at the axis of the cylindrical configuration while the low pressure passage 132 is concentrically external thereto. That is, the high pressure liquid passes from an elbow 62 into an axial tube 134 extending the full length of the heat exchanger 64 and emerging into the line 66. The tube 134 carries a helical vane 136 extending substantially the full length of the tube 134 and providing a substantial radiating surface. The tube 134 may be integrally formed with the vane 136, for example, of copper or other metals for effective heat transfer. The tube 134 along with the vane 136 is contained in a tubular housing 138 having end closures 140 and 142 through which exhaust and intake passages are afforded.

In considering the operation of the heat exchanger 64, cool gas entering the external cavity or passage 132 from the evaporator further cools the liquid refrigerant contained within the tube 134. As a result, this system is more efficient in operation. In addition to this increased efficiency, provided by the heat exchanger 64, another very important function is performed by this structure. Specifically, the heat exchanger 64 accumulates a small quantity of lubricant, e.g. oil 144, which is transferred to the compressor at the beginning of a period of operation. That is, the system hereof is designed, as described above, for intermittent operation under the control of the thermostate. During an interval when the compressor is inoperative, lubricating oil tends to drain from bearing surfaces of the compressor, leaving such surfaces substantially dry. As a result, normally a great many operating cycles would be accomplished before lubricating oil was supplied to the compressor. However, in the system hereof, a quantity of lubricating oil 144 is accumulated in the heat exchanger 64, for immediate delivery to bearing surfaces within the compressor 10 when operation of the compressor is resumed.

The oil 144 is condensed from oil vapors moving with the gaseous spent refrigerant through the passage 132. That is, oil-carrying refrigerant entering the passage 132 impacts on the vane 136 depositing oil vapor. After a brief period of operation, a substantial oil vapor is accumulated on the vane 136 and remains substantially at equilibrium as operation continues. However, when the compressor is stopped, the oil vapor condensed on the vane 136 drains off, accumulating a small reservoir of oil 144. Still later, when the compressor 10 again resumes operation, the quantity of oil 144 is immediately blown as a liquid slug through the line 14 into the compressor crankcase in which it is directed to friction surfaces. As a result of this structure, the life of the compressor is greatly prolonged and the initial load of the compressor 10 on the engine 22 is substantially reduced to avoid loads which would otherwise tend to shock the engine.

Considering the compressor and the particular structure thereof in detail, reference will now be made somewhat simultaneously to FIGURES 6 through 10 showing both the compressor and the magnetic clutch mechanism associated therewith in detail. The compressor comprises a body or block 150 (FIGURE 8) which may be a machined casting as well known in the prior art. The body or block 150 of the compressor is affixed to the automobile by receiving the stud 116 in a threaded bore 152. The block 150 defines internal cylinder bores 154 and 156, an internal crankcase, intake passages 158, and exhaust passages 160. The block 150 is a V-configuration engine, and in general the compressor operates through valving structures mounted between cylinder heads and the block 150 in valve plates. The crankcase, containing the main bearing on the crankshaft is effectively lubricated in cooperation with the structure considered above. Such effective lubrication in cooperation with the particular valving structure as described below affords effective operation of the compressor in the system hereof.

In analyzing the compressor, in greater detail, the component parts may be effectively introduced and explained by treating the flow path of the refrigerant. Therefore, consider low-pressure gaseous refrigerant from the line 14 which is introduced to the threaded bore 162 (FIGURE 8) of the compressor. The bore 162 intersects a pair of angularly-offset bores 164 and 166 extending from the point of intersection to the head end of the cylinders 154 and 156. It is to be noted that the component structure associated with each of the cylinders 154 and 156 is generally similar, therefore, the two cylinders and related structure will be concurrently treated, by the explanation of a single flow pattern.

The initial operation of the compressor develops a low intake manifold pressure in the passages 164 and 166 (FIGURE 8) which pulls the slug of accumulated oil 144 (FIGURE 5) into a passage 167 (FIGURE 8) of reduced diameter. The oil, deposited in the passage 167 then drips onto the bearing surfaces for immediate lubrication, pending the time when the crankshaft counterweight splashes effective quantities of oil. This arrangement has been determined to be very effective in the instant application.

Considering the gaseous refrigerant flow path, the intake passage 164 terminates at a cavity 168 defined in the cylinder head 170 (center right, FIGURE 8). The cavity 168 is the low side or intake of the compressor while a similar cavity 172 at the other side of the head 170 is a high side.

The low-pressure gaseous refrigerant received through the passage 164 in the head cavity 168 encounters a closure defined by a gasket 174, a valve plate 176, a gasket 178, and the body or block 150. The valve plate 176 is affixed to the head 170 by a stud 177 and defines corner bores 180 through which studs 182 pass (also through gaskets 174 and 178) to engage the block 150. The valve plate 176 also defines a valve seat bore 181 that is normally closed by a flap valve 186. The flap valve 186 is seated in a detent 187 and within the gasket 178 which also provides the spaced relationship between the block 150 and the valve plate 176. The valve 186 is held in position by pins 188 which pass through bores 190 in the valve 186 and seat in the block 150. Specifically, the pins 188 are seated in a recessed bore 192 above which the pins 188 carry coil springs 194. That is, the bore 192 is of two distinctly different diameters including an internal small diameter snugly receiving the pins 188 and an external, larger diameter into which the springs 194 are seated. Above the springs 194 the flap valve 88 resides on the pins 188, urged in closed relationship over the valve seat bore 181 in the valve plate.

Therefore, low-pressure refrigerant contained in the cavity 168 of the cylinder head 170 is drawn through the bore 181 by the downstroke of the piston (described below) contained within the cylinder 154 which action pulls the flap valve 186 downwardly to an open position. At the completion of the stroke, the pressure on either side of the flap valve is essentially in a balanced relationship with the result that the resilient leaf spring nature of the flap valve 186 cooperatively acting with the coil springs 194 promptly snaps the valve 186 to a closed position over the valve bore 181. As a result, valve action in the compressor is nearly immediate, providing improved operating efficiency.

Considering the exhaust valve action, as the piston within the cyinder 154 begins a compression stroke, the flap valve 186 is fully closed and the operation now becomes the pressurized movement of the refrigerant through the valve bore 196 of the plate 176 (normally closed by a bridge flap valve 198) into the high cavity 172. The valve 198 is held in position by pins 200 anchored in the cylinder head 170. The pins 200 also extend through springs 202, washers 204 and a retainer leaf spring 206.

Recapitulating, during the compression stroke of the piston which is within the cylinder 154, gaseous refrigerant is forced under pressure through the gasket 178 (FIGURE 8) the bore 196 in the valve plate 176 (as a result of the displacement of the flap valve 198) through the gasket 174 into the cavity 172 in the cylinder head 170. Thereafter, the gas flows through one of the passages 160 into an intersecting transverse passage 210, which is threaded to receive a connection to the hose 37 (FIGURE 2) The action of the valves may also be ar alyzed by a consideration of FIGURES 9 and 10. Spe cifically, when the pressure differential between the cavity 168 and the inside of the cylinder 154 becomes sufficient, the flap valve 186 (FIGURE 10) drops to a lower position within the groove 187 thereby opening the bore 181 for the passage of gaseous refrigerant into the cylinder 154. Conversely, during an exhaust stroke, the pressure within the cylinder 154 exceeds the pressure in the cavity 174 with the result that the valve 198 (FIGURE 9) is raised against the force of the flat spring 206 and the coil springs 202 (carried on the pins 200), to pass the pressurized gas.

An important consideration in the operation of the valve structure resides in the use of flat valves comprising resilient sheet metal that are loosely anchored in cooperative relationship with coil springs to accomplish prompt closure at the end of a cyclic stroke. Fatigue and efficiency aspects are both improved.

Figure 6:
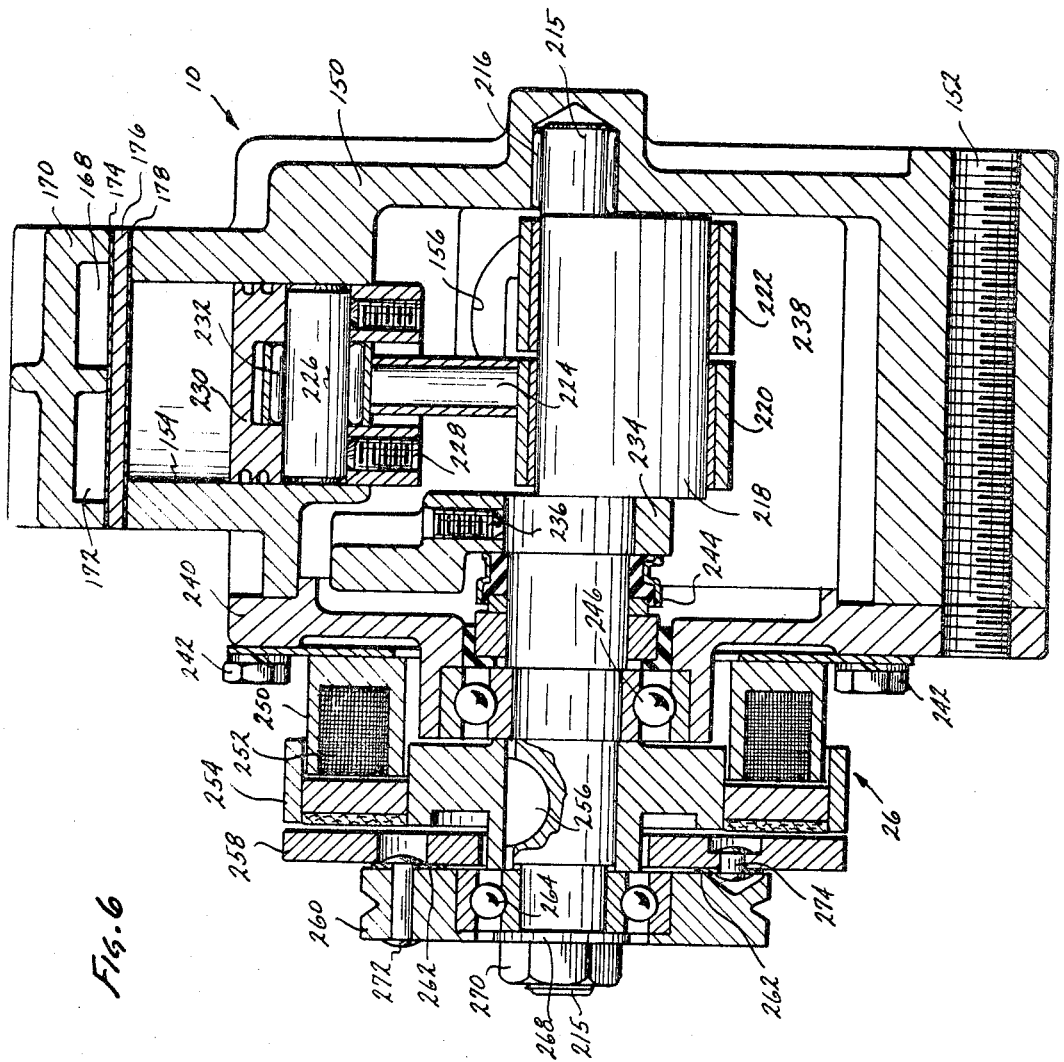
FIGURE 6 is a sectional view taken along line 6—6 of FIGURE 3.

The actual compressor operation for providing the pressure differentials accommodated by the valves may be best considered with respect primarily to FIGURE 6. The block 150 of the compressor carries a centrally located crankshaft 215 the internal end (right, FIGURE 6) of which is journalled into a bearing 216 contained in an end bore of the block 150. To the left of the bearing 216 (as shown) the crankshaft 215 includes an eccentric section 218 carrying a pair of side-by-side bearings 220 and 222. These bearings are respectively contained by connecting rods 224 extending to engage wrist pins that are seated by studs 228 in pistons 230. The wrist pins 226 are connectively engaged to the rods 224 through wrist pin bearings 232. Therefore, as the crankshaft 215 is revolved, the pistons 230 are alternatively raised and lowered within the cylinders 154 to activate the valves (not shown in FIGURE 6) in the valve plate 176 as described above. The structure of the pistons and related structure may take a wide variety of different forms as generally well known in the prior art. In the cyclic operation of the compressor, a counterweight 234, fixed on the crankshaft 215 by a set screw 236 not only provides dynamic balancing for the reciprocating members but further acts as a splasher for oil contained within the crankcase 238. This action in cooperation with the initial lubrication described above results in long and effective compressor life. The crankcase 238 is closed by a cover 240 affixed to the block 150 by studs 242. Furthermore, the cover 240 incorporates a packing gland seal 244 about the crankshaft 215. Still further, a ball bearing 246 is also received in the cover 240 to accommodate low friction rotation of the crankshaft 215. The structure outside the bearing 246 (remote from the crank case 238 as shown) constitutes the magnetic clutch unit which is best considered with somewhat concurrent reference to FIGURES 6 and 7.

An annular cup 250 (FIGURE 7) is affixed to the cover 240 and the block 150 by studs 242. The cup 250 (FIGURE 6) contains a coil 252 for providing a magnetic field to actuate the clutch structure. The coil lies in facing relationship to a rotor assembly 254 which is affixed to the crankshaft 215 by a key 256. The rotor assembly 254 in turn abuts a circular armature 258 which is affixed to a pulley 260 through flexures or leaf-spring fasteners 262 (FIGURE 7). The pulley 260 rides on a ball bearing 264 which is held in position by a washer 268 and a nut 270 threadably engaged on the end of the crankshaft 215.

In the operation of the clutch, during intervals when the coil 252 is not energized, the pulley 260 rotates freely on the bearings 264 driving the armature 258 freely in such rotation; however, imparting no motion to the rotor assembly 254. Then, when the compressor it to operate, the coil 254 is energized to provide a magnetic field actuating the armature 258 into engagement with the rotor assembly as a result of the axial motion permitted by the fasteners 262. That is, the facing engagement between the rotor assembly 254 and the armature 258 causes the rotor assembly 254 to be revolved, which in turn revolves the crankshaft 215 as a result of a direct coupling to the key 256. The compressor is thereupon driven to actuate the entire system.

It may therefore be seen, that the system hereof is capable of efficient and effective intermittent operation through control of the magnetic clutch and specifically in accordance with the state of energization of a coil 252. In this regard, the flexure for the coupling and decoupling movement is accommodated by the leaves 262 as considered above. It is to be noted that these leaves are anchored to the pulley 260 by rivets 272 and are similarly anchored to the armature 258 by rivets 274. As a result, axial motion between the armature 258 and the pulley 260 sufficient to effectively couple and decouple the armature from the rotor assembly 254 is possible.

Recapitulating with respect to the composite system, the above detailed description representative of the developments hereof may be effectively employed for air-conditioning a small automobile including automobiles incorporating an air-cooled engine.

*Advantages of the invention*

The system hereof may be readily employed to air condition a small, compact automobile without the necessity of substantial modification or interfering system components. In this regard, the compressor of this system is provided in a configuration readily adaptable for use in the engine compartment of a small automobile. The mounting arrangement need not radically interfere with normal or extraordinary servicing of the engine. Furthermore, in the system hereof with the condenser mounted in a horizontal configuration, these units remain effective in operation yet do not interfere with the automobile's appearance, engine cooling system or convenient use. The system hereof thus affords not only substantial economy in space but also affords economy in operation. Specifically, the system incorporates an effective lubricating means to minimize friction losses and additionally automatically regulates the operation of the evaporator coil for optimum effect. These advantages are accomplished with relatively low cost and maintenance.

Of course, various other advantages will become apparent to those skilled in the art, as will various other embodiments of the system which are quite different from the specific embodiment disclosed herein. As a result, the scope hereof is not to be interpreted with reference to the illustrative embodiment set forth above but rather shall be determined in accordance with the claims set forth below.

What is claimed is:

1. An air-conditioning system, of the type employing a refrigerant bearing a lubricant, said system for cooling a compact automobile having an engine of limited power, comprising:
    a compressor means connected to be driven by said engine and mounted contiguous thereto;
    condenser means, including heat-exchange tubes, said condenser means formed in substantially flat configuration, extending laterally across the automobile and affixed to the exterior of said automobile horizontally;
    cooling coil means affixed in the interior of said automobile;
    blower means for passing air over said cooling coil means whereby to cool the interior of said automobile; and
    duct means for conveying said refrigerant through a cycle from said compressor through said condenser means and said coil means then back to said compressor, said duct means including a heat-exchanger connected to provide heat exchange between said refrigerant flowing to and from said coil means, said heat exchanger including reservoir means to collect lubricant from said refrigerant, for return to said compressor.

2. A system according to claim 1 wherein said compressor is supported on brackets affixed to said automobile and which includes a belt drive coupling said compressor to said engine.

3. A system according to claim 1 further including a clutch coupled between said engine and said compressor and a control means for said clutch whereby said clutch is engaged and disengaged in accordance with the temperature of said cooling coil.

4. A system according to claim 3 wherein said clutch comprises a magnetic clutch and said control means includes a thermostat control contiguous to said cooling coil.

5. A system according to claim 1 wherein said duct means includes at least one section of rubber hose and further includes a muffler affixed in said section of rubber hose.

6. A system according to claim 5 wherein said muffler comprises rigid means defining an internal cavity of substantially cylindrical configuration.

7. A system according to claim 1 further including means defining an airflow path whereby to force air to pass about said heat-exchange tubes as said automobile moves.

8. A system according to claim 1 wherein said condenser means comprises two condensers connected in series to receive said refrigerant from said compressor, a first of said condensers having a flow direction similar to the forward direction of said automobile and a second of said condensers having a flow direction opposed to said forward direction.

9. A system according to claim 1 wherein said compressor is a V-drive configuration.

10. A system according to claim 1 wherein said compressor includes at least one reed valve comprising a valve flap, a pin transversely extending through said valve flap and fixed in said compressor, and a coil spring on said pin urging said valve flap to a closed position.

References Cited

UNITED STATES PATENTS

| | | | |
|---|---|---|---|
| 2,774,220 | 12/1956 | Heym | 62—244 |
| 2,863,301 | 12/1958 | Philipp | 62—323 XR |
| 3,006,160 | 10/1961 | Heidorn | 62—296 |
| 3,145,545 | 8/1964 | Jaeger | 62—323 |
| 3,185,388 | 5/1965 | Siman | 230—228 |

MEYER PERLIN, *Primary Examiner.*

U.S. Cl. X.R.

62—244, 296, 323, 513; 230—228